United States Patent
Hong et al.

(10) Patent No.: US 8,773,314 B2
(45) Date of Patent: Jul. 8, 2014

(54) ANTENNA PATTERN FRAME, CASE OF ELECTRONIC DEVICE AND MOULD FOR MANUFACTURING THE SAME

(75) Inventors: Ha Ryong Hong, Gyunggi-do (KR); Sung Eun Cho, Gyunggi-do (KR); Duk Woo Lee, Gyunggi-do (KR); Dae Kyu Lee, Gyunggi-do (KR); Chan Gwang An, Gyunggi-do (KR); Jae Suk Sung, Gyunggi-do (KR); Ki Won Chang, Gyunggi-do (KR); Chang Mok Han, Chungcheongnam-do (KR); Sang Woo Bae, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 581 days.

(21) Appl. No.: 13/022,117

(22) Filed: Feb. 7, 2011

(65) Prior Publication Data
US 2011/0205127 A1   Aug. 25, 2011

(30) Foreign Application Priority Data
Feb. 25, 2010 (KR) .................. 10-2010-0017246

(51) Int. Cl.
*H01Q 1/22* (2006.01)
*H01Q 1/40* (2006.01)
*B29C 45/14* (2006.01)

(52) U.S. Cl.
USPC .................. 343/702; 343/873; 425/116

(58) Field of Classification Search
USPC ................... 343/702, 873; 425/116
See application file for complete search history.

(56) References Cited

U.S. PATENT DOCUMENTS

| 4,944,087 | A | 7/1990 | Landi |
| 6,285,324 | B1 | 9/2001 | Korisch et al. |
| 6,396,444 | B1 | 5/2002 | Goward et al. |
| 7,605,765 | B2 * | 10/2009 | Ku .................. 343/702 |
| 2006/0216469 | A1 | 9/2006 | Hashizume et al. |
| 2007/0040755 | A1 | 2/2007 | Na et al. |
| 2007/0216580 | A1 | 9/2007 | Lin et al. |
| 2008/0067715 | A1 | 3/2008 | Sung |
| 2009/0015507 | A1 * | 1/2009 | Hong et al. .......... 343/873 |
| 2009/0059543 | A1 | 3/2009 | Choe et al. |
| 2011/0032153 | A1 | 2/2011 | Hong et al. |

FOREIGN PATENT DOCUMENTS

| CN | 1288272 | A | 3/2001 |
| CN | 1336020 | A | 2/2002 |
| CN | 101997157 | A | 3/2011 |
| EP | 1783858 | A1 | 5/2007 |

(Continued)

OTHER PUBLICATIONS

EP Search Report of 11250431.1-2220, dated Aug. 19, 2011.

(Continued)

*Primary Examiner* — Jerome Jackson, Jr.
*Assistant Examiner* — Andrea Lindgren Baltzel
(74) *Attorney, Agent, or Firm* — McDermott Will & Emery LLP (57) ABSTRACT

There is provided an antenna pattern frame, including: a radiator that includes an antenna pattern part transmitting and receiving signals and a connection terminal part transmitting and receiving the signals to and from a circuit substrate of an electronic device; and a radiator frame that embeds the antenna pattern part in a case of the electronic device and supports the radiator, the radiator being manufactured by injection molding, wherein the radiator frame forms a guide boss inserted into a manufacturing mould for injection-molding the case of the electronic device in which the radiator is embedded.

11 Claims, 12 Drawing Sheets

(56) References Cited

FOREIGN PATENT DOCUMENTS

| | | | |
|---|---|---|---|
| FR | 2806343 A1 | 9/2001 | |
| JP | 58020418 A | 2/1983 | |
| JP | 61268415 A | 11/1986 | |
| JP | 62221521 A | 9/1987 | |
| JP | 07088888 A | 4/1995 | |
| JP | 08276458 A | 10/1996 | |
| JP | 2008226099 A | 9/2008 | |
| KR | 100910161 | * 7/2009 | ............... H01Q 1/24 |
| KR | 100910161 B1 | 7/2009 | |
| KR | 100932079 B1 | 12/2009 | |
| WO | 0039883 A1 | 7/2000 | |

OTHER PUBLICATIONS

EP Search Report of 11250429.5-2307, dated Aug. 24, 2011.
Chinese Office Action for Patent Application No. 201110049873.8 issued Mar. 26, 2013.

* cited by examiner

ANTENNA PATTERN FRAME, CASE OF ELECTRONIC DEVICE AND MOULD FOR MANUFACTURING THE SAME

CROSS-REFERENCE TO RELATED APPLICATIONS

This application claims the priority of Korean Patent Application No. 10-2010-0017246 filed on Feb. 25, 2010, in the Korean Intellectual Property Office, the disclosure of which is incorporated herein by reference.

BACKGROUND OF THE INVENTION

1. Field of the Invention

The present invention relates to an antenna pattern frame, a case of an electronic device, and a mould for manufacturing the same, and more particularly, to an antenna pattern frame having an antenna radiator formed on the surface thereof so that the antenna radiator is embedded in a case of an electronic device, a case of an electronic device, and a mould for manufacturing the same.

2. Description of the Related Art

Mobile communication terminals, for example, cellular phones, PDAs, navigation devices, notebook computers, or the like, that are used to support wireless communication are necessities in modern society. Mobile communication terminals are being developed to have functions, such as CDMA, wireless LAN, GSM, DMB, or the like. One of the most important parts that enable these functions is an antenna.

The antenna used in the mobile communication terminal has devolved from an exterior type antenna such as a rod antenna or a helical antenna to an interior type antenna where an antenna is mounted in the terminal.

There have, however, been problems, in that the exterior type antenna is vulnerable to external impacts and the interior type antenna increases the volume of the terminal.

In order to solve the problems, a research to integrate the mobile communication terminal and the antenna has been actively conducted.

SUMMARY OF THE INVENTION

An aspect of the present invention provides an antenna pattern frame having an antenna radiator formed on the surface thereof and a case of an electronic device in which the antenna radiator is embedded.

Another aspect of the present invention provides a mould for manufacturing an antenna pattern frame and a case of an electronic device in which an antenna radiator is embedded.

Another aspect of the present invention reduces an appearance defect by stably fixing an antenna pattern frame to a mould for manufacturing a case of an electronic device when molding the case of the electronic device in which an antenna radiator is embedded.

According to an aspect of the present invention, there is provided an antenna pattern frame, including: a radiator that includes an antenna pattern part transmitting and receiving signals and a connection terminal part transmitting and receiving the signals to and from a circuit substrate of an electronic device; and a radiator frame that embeds the antenna pattern part in a case of the electronic device and supports the radiator, the radiator being manufactured by injection molding, wherein the radiator frame forms a guide boss inserted into a manufacturing mould for injection-molding the case of the electronic device in which the radiator is embedded.

The guide boss may include a slot part therein so that it is elastically supported and fixed to the manufacturing mould.

The radiator frame includes an introducing hole formed to introduce a resin material when injection-molding the case of the electronic device.

The radiator may include a connection part that is a part of the radiator and connects the antenna pattern part to the connection terminal part, and the connection part may be formed so that the antenna pattern part is formed on one surface of the radiator frame and the connection terminal part is formed on an opposite surface to the one surface.

The connection terminal part may contact and support the radiator supporting part that is protruded from the opposite surface of the one surface on which the antenna pattern part of the radiator frame is formed.

According to another aspect of the present invention, there is provided a case of an electronic device, including: a radiator that includes an antenna pattern part transmitting and receiving signals and a connection terminal part transmitting and receiving the signals to and from a circuit substrate of an electronic device; a radiator frame including a guide boss that supports and fixes the radiator and is inserted in the manufacturing mould for injection-molding the case of the electronic device in which the radiator is embedded, the radiator being manufactured by injection molding; and a case frame that covers one surface of the radiator frame to embed the antenna pattern part between the radiator frames.

The guide boss may include a slot part so that it is elastically supported and fixed to the manufacturing mould.

The radiator frame may include an introducing hole formed to introduce a resin material when injection-molding the case of the electronic device.

The introducing hole may be formed to integrate a resin material introduced through the introducing hole with the guide boss.

The connection part may be formed so that the antenna pattern part is formed on one surface of the radiator frame and the connection terminal part may be formed cn an opposite surface to the one surface.

The connection terminal part may contact and support the radiator supporting part that is protruded from the opposite surface of the one surface on which the antenna pattern part of the radiator frame is formed.

According to another aspect of the present invention, there is provided a mould for manufacturing an antenna pattern frame, including: upper and lower moulds receiving a radiator that includes an antenna pattern part transmitting and receiving signals, a connection terminal part connected to a circuit substrate of an electronic device, and a connection part connecting the antenna pattern part to the connection terminal parts; and when the upper and lower moulds are combined with each other, a resin material introducing part formed in any one of the upper, lower, or upper and lower moulds to introduce a resin material into an inner space so that the inner space of the upper and lower moulds becomes the radiator frame to embed the antenna pattern part in the case of the electronic device, wherein the lower mould includes a guide groove so that the radiator frame includes a guide boss that is inserted into the manufacturing mould for injection-molding the case of the electronic device and the radiator is the radiator frame by the inner space.

The lower mould may include a protruding part corresponding to the slot part in the guide groove to form a slot part in the guide boss.

Any one of the upper, lower, or upper and lower moulds may include an interrupting boss that prevents the resin material from being introduced in order to form an introducing hole for introducing the resin material on the antenna pattern frame when the case of the electronic device is injection-molded.

The inner space of the upper and lower moulds may receive the connection terminal part and may include a radiator supporting part forming groove in order to form the radiator supporting part supporting the connection terminal part.

Any one of the upper, lower or upper and lower moulds may be provided with a compression pin that compresses the connection terminal part disposed in the radiator supporting part forming groove.

According to another aspect of the present invention, there is provided a mould for manufacturing a case of an electronic device, including: upper and lower moulds that receive a radiator including an antenna pattern part transmitting or receiving signals, a radiator including a connection terminal part contacting a circuit substrate of an electronic device, a radiator frame supporting the radiator, and an antenna pattern frame including a guide boss formed to be protruded from one surface of the radiator frame; when the upper and lower moulds are combined with each other, a resin material introducing part formed in any one of the upper, lower, or upper and lower moulds to form a case of an electronic device by combining the antenna pattern frame with the resin material due to the introduction of the resin material in the inner space of the upper and lower moulds; and wherein the lower mould includes a guide groove formed to insert the guide boss and the antenna pattern frame is the case of the electronic device by the inner space.

The guide groove may include the guide boss receiving part to fix and support the guide boss.

The guide boss receiving part is configured of a variable part having a diameter larger than that of the guide boss and a fixing part having a diameter smaller than that of the variable part.

The variable part may receive the guide boss by being protruded to the upper portion of the lower mould before the guide boss is inserted, and may be inserted into the guide groove of the lower mould after the guide boss is received.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention.

Further, throughout the drawings, the same or similar reference numerals will be used to designate the same components or like components having the same functions in the scope of the similar idea.

Figure 1:
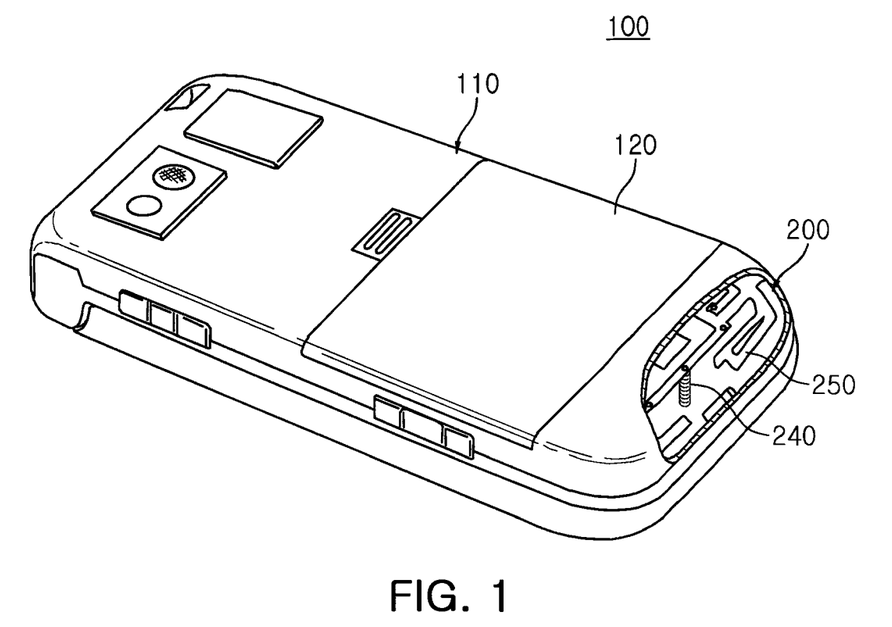
FIG. 1 is a perspective view schematically showing a partially cutaway case of an electronic device, a mobile communication terminal according to an exemplary embodiment of the present invention.
Figure 2:
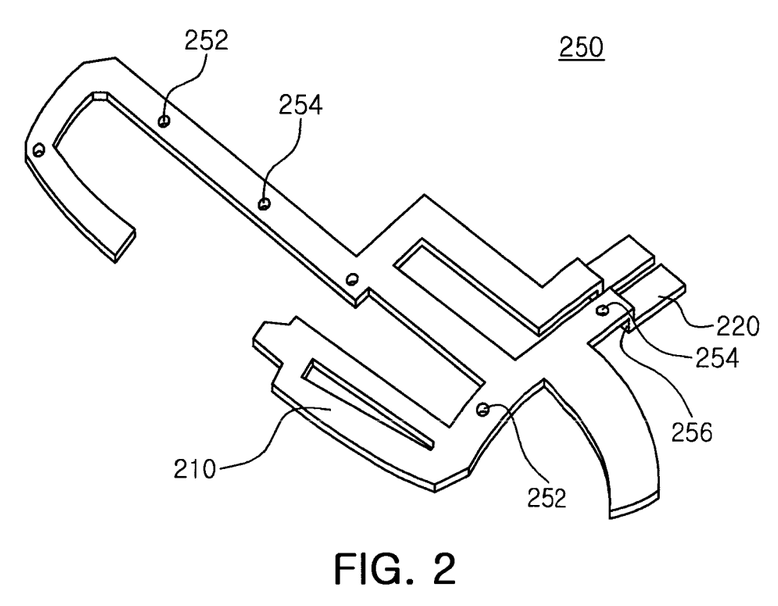
FIG. 2 is a perspective view schematically showing a radiator used in manufacturing an antenna pattern frame according to an exemplary embodiment of the present invention.
Figure 3:
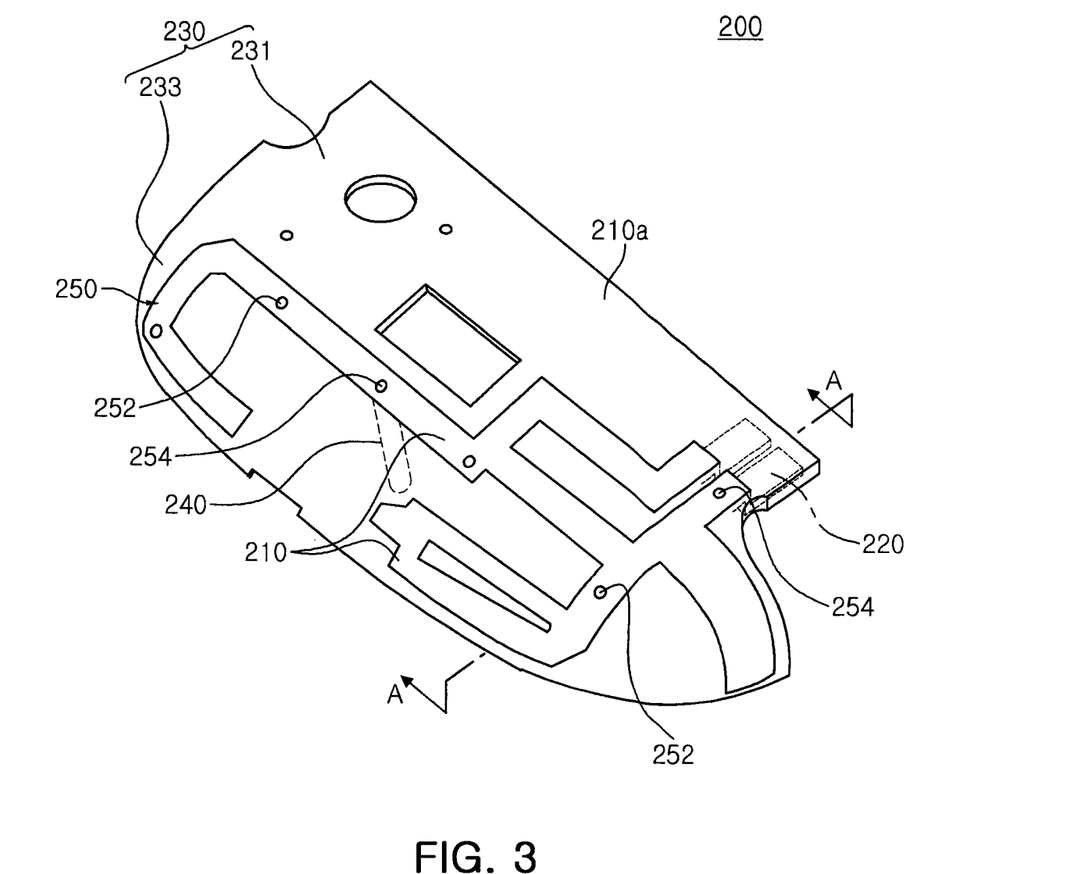
FIG. 3 is a perspective view schematically showing an antenna pattern frame according to an exemplary embodiment of the present invention.
Figure 4:
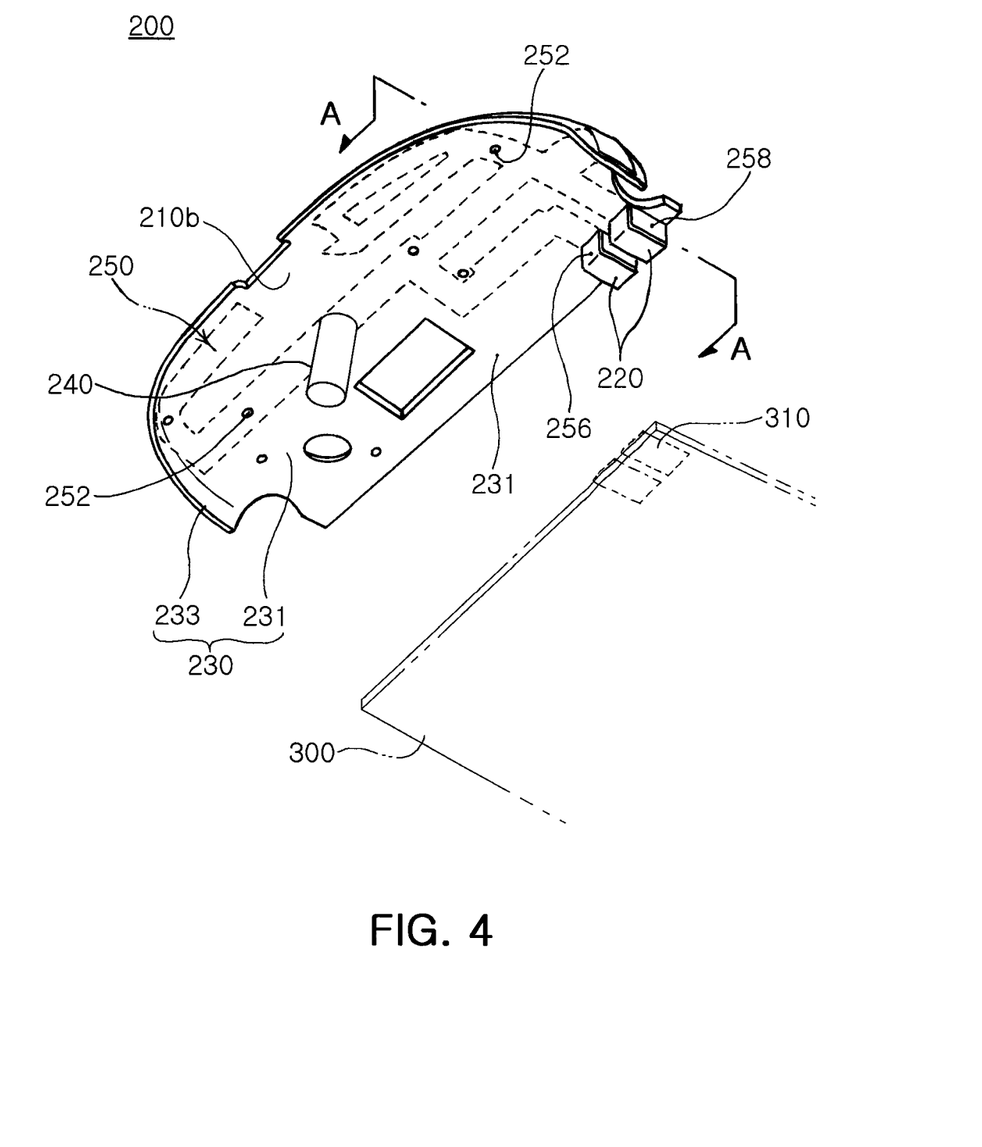
FIG. 4 is a rear perspective view of the antenna pattern frame of FIG. 3.

FIG. 1 is a perspective view schematically showing a partially cutaway case of an electronic device, a mobile communication terminal according to an exemplary embodiment of the present invention, FIG. 2 is a perspective view schematically showing a radiator used in manufacturing an antenna pattern frame according to an exemplary embodiment of the present invention, FIG. 3 is a perspective view schematically showing an antenna pattern frame according to an exemplary embodiment of the present invention, and FIG. 4 is a rear perspective view of the antenna pattern frame of FIG. 3.

Referring to FIGS. 1 through 4, it can be appreciated that a radiator 250 provided with an antenna pattern according to an exemplary embodiment of the present invention is embedded in a case 110 of a mobile communication terminal 100. In order to form the radiator 250 provided with the antenna pattern in the inside of the case 110, an antenna pattern frame 200 that forms the radiator 250 provided with the antenna pattern on a radiator frame 230 is needed.

The antenna pattern frame 200 according to an exemplary embodiment of the present invention may include the radiator 250 provided with an antenna pattern part 210, a connection terminal part 220, the radiator frame 230, and a guide boss 240.

The radiator 250 is made of a conductive material such as aluminum, copper, or the like, to receive external signals and to transmit them to a signal processing unit in the electronic device such as the mobile communication terminal 100. Further, the radiator 250 may include the antenna pattern part 210 forming a meander line in order to receive the external signals of various bands.

The radiator 250 in which the antenna pattern part 210 receiving the external signals and the connection terminal part 220 contacting a circuit substrate of the electronic device to transmit the external signals to the electronic device are disposed on a different plane may be provided.

Further, the radiator 250 may be formed to have a three-dimensional structure by bending the antenna pattern part 210 and the connection terminal part 220, respectively, and the antenna pattern part 210 and the connection terminal part 220 may be bent and connected to each other by a bending connection part 256.

The bending connection part 256 may configure the antenna pattern part 210 and the connection terminal part 220 on a different plane and the connection terminal part 220 that is not embedded in the case of the electronic device may be exposed at an opposite surface 210b of the antenna pattern frame 200.

In other words, the antenna pattern part 210 and the connection terminal part 220 are bent by the bending connection part 256, such that the radiator 250 may be implemented to have a three-dimensional curved shape.

In order to support the radiator 250 having the three-dimensional curved shape, a radiator supporting part 258 may be protruded from the opposite surface 210b of the radiator frame 230.

The radiator supporting part 258 may firmly support the connection terminal part 220 exposed to the opposite surface 210b and the bending connection part 256.

The radiator 250 may be simultaneously formed with guide pin holes 252 or contact pin holes 254.

The guide pin hole 252 and the contact pin hole 254 will be described below.

The connection terminal part 220 transmits the received external signals to the electronic device and may be formed by performing the bending, forming, and drawing processing on a part of the radiator 250.

In addition, after the connection terminal part 220 is separately manufactured from the radiator 250, it may be manufactured to connect to the radiator 250 and may be connected to the terminal 210 of the circuit substrate 300.

Meanwhile, the radiator frame 230 may be a three-dimensional structure formed of a flat plane part 231 and a curve part 233 having a curvature. The radiator 250 may be flexible so that it is disposed at the curved part 233 of the radiator frame 230.

The radiator frame 230 is an injection structure, the antenna pattern part 210 may be formed on one surface 210a of the radiator frame 230, and the connection terminal part 220 may be formed on the opposite surface 210b of the one surface 210a.

The radiator frame 230 may embed the antenna pattern in the case 110 of the electronic device by bonding the one surface 210a formed with the antenna pattern part 210 to the inside of the case 110 of the electronic device.

In the structure of the radiator 250 embedded in the case 110 of the electronic device, the antenna pattern part 210 receiving the external signals and the connection terminal part 220 transmitting the external signals to the electronic device may be formed on a different plane.

The guide boss 240 is formed to be protruded from the opposite surface of the one surface 210a formed with the antenna pattern part 210 of the radiator frame 230 and may be inserted in the manufacturing mould 500 (see FIG. 10) for injection-molding the case 120 of the electronic device.

The guide boss 240 is inserted into the manufacturing mould 500 (see FIG. 10) such that it can be stably fixed on the mould, thereby making it possible to reduce the appearance defect and withstand the high injection pressure.

Figure 5A:
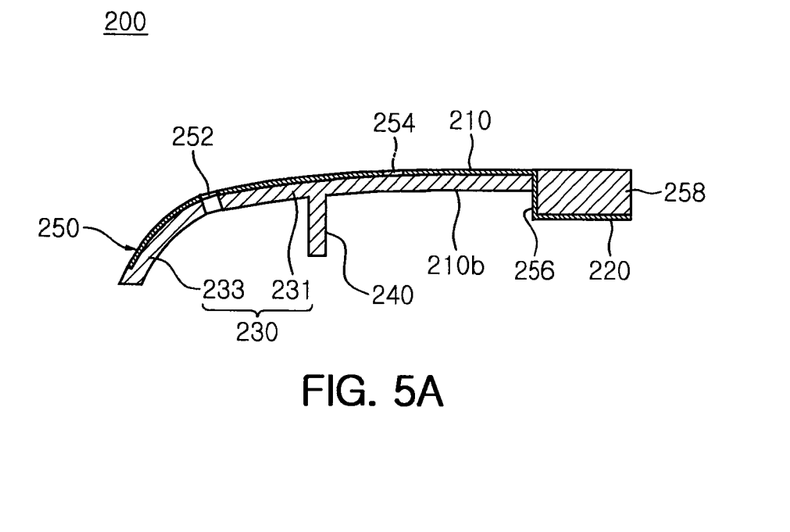
FIG. 5A is a schematic cross-sectional view taken along line A-A of FIGS. 3 and 4.
Figure 5B:
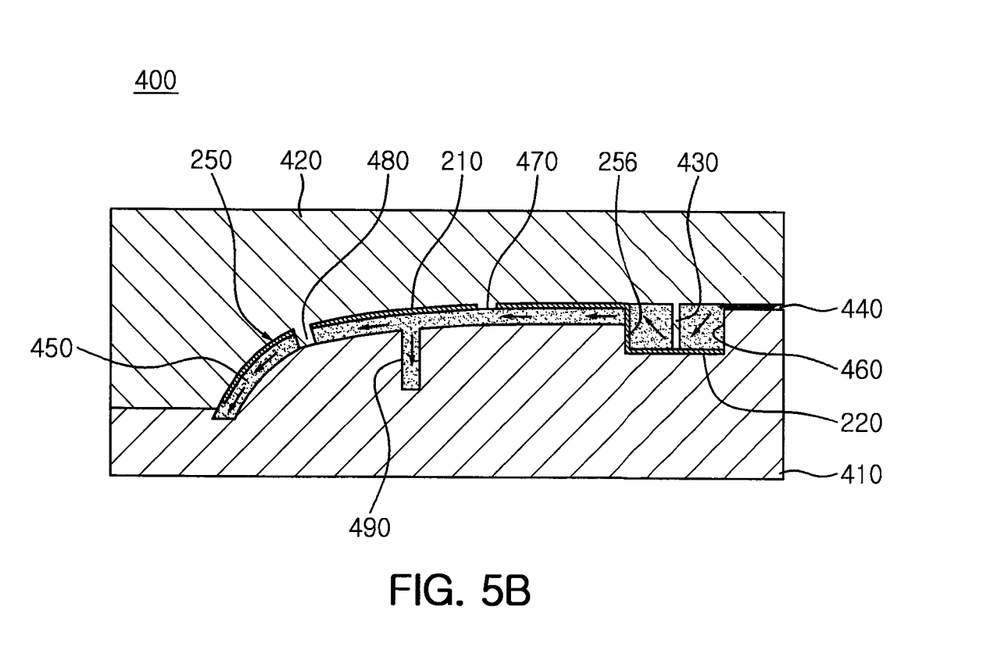
FIG. 5B is a schematic cross-sectional view showing a shape where a resin material is filled in a mould for manufacturing the antenna pattern frame in order to manufacture the antenna pattern frame of FIG. 5A.

FIG. 5A is a schematic cross-sectional view taken along line A-A of FIGS. 3 and 4, FIG. 5B is a schematic cross-sectional view showing a shape where a resin material is filled in a mould for manufacturing the antenna pattern frame in order to manufacture the antenna pattern frame of FIG. 5A, and FIGS. 6A to 7B are cross-sectional views schematically showing another embodiment.

Referring to FIG. 5A, the antenna pattern frame 200 according to an exemplary embodiment of the present invention may include the radiator 250 provided with the antenna pattern part 210, the connection terminal part 220, the radiator frame 230, and the guide boss 240.

The radiator 250 may be simultaneously provided with the guide pin holes 252 or the contact pin holes 254 and is the same as the exemplary embodiment other than the guide pin hole 252 or the contact pin hole 254 and therefore, a description thereof will be described.

The radiator 250 may be disposed with the guide pin 480 of the manufacturing mold 400 when performing the molding and may be formed with the guide pin holes 252 that prevent the motion of the radiator 250 on the radiator frame 230.

In addition, the radiator 250 may be disposed with the contact pin 470 of the manufacturing mold 400 when performing the molding and may be formed with the contact pin holes 254 that prevent the motion of the radiator 250 on the radiator frame 230.

The contact pin 470 and the guide pin 480 may be formed on the radiator 250 and the radiator frame 230 under the contact pin 470 is filled after performing the molding but the radiator frame 230 under the guide pin 480 is formed with holes.

The contact pin 470, inserted into the contact pin hole 254 formed on the radiator 250, serves to prevent a horizontal movement of the radiator 250 in the mould 400 for manufacturing the antenna pattern frame 200.

Further, the guide pin 480 inserted into the guide pin hole 252 formed on the radiator 250 serves to prevent a vertical movement of the radiator 250 in the mould 400 for manufacturing the antenna pattern frame 200.

Referring to FIG. 5B, the radiator 250 is disposed in the inner space 450 of the manufacturing mould 400 after providing the radiator 250.

The inner space 450 is formed when an upper mould 420 and a lower mould 410 are combined with each other and the groove formed in the upper mould 420 or the lower mould 410 becomes the inner space 450 by the combination of the upper mould 420 and the lower mould 410.

When the upper mould 420 and the lower mould 410 are combined with each other, the radiator 250 may be fixed to the inner space 450 by passing or contacting the guide pin 480, the contact pin 470 or the guide pin 480 and the contact pin 470 that are formed in the upper or lower moulds 410 and 420, through and to the guide pin hole 252, the contact pin hole 254 or the guide pin hole 252 and the contact pin hole 254 that are formed in the antenna pattern part 210.

The inner space 450 is filled with the resin material to form the radiator frame 230 that embeds the antenna pattern part 210 in the case 120 of the electronic device.

When the upper and lower moulds are combined with each other, the inner space 450 of the upper and lower moulds becomes the radiator frame 230 so that the antenna pattern part 210 is embedded in the case 120 of the electronic device to introduce the resin material into the inner space, thereby making it possible to form the resin material introducing part 440 in any one of the upper, lower or upper and lower moulds.

The resin material is identically filled at the boundary surface between the radiator 250 and the radiator frame 230, such that the flowing of the resin material can be good when putting the radiator frame 230 in the mould for manufacturing the case 110 of the electronic device in which the antenna pattern is embedded and injection-molding the radiator frame 230.

At this time, the inner space 450 of the upper or lower moulds 410 and 420 is formed with a curve part, such that the radiator frame 230 may have the curve part.

Further, the inner space 450 of the upper and lower moulds 410 and 420 may accommodate the connection terminal part 220 and include the radiator supporting part forming groove 460 to form the radiator supporting part 258 supporting the connection terminal part 220.

In addition, the upper, lower or upper and lower moulds 410 and 420 may be provided with a compression pin 430 that compresses the connection terminal part 220 disposed in the radiator supporting part forming groove 460 to closely attach the connection terminal part 220 to the radiator supporting part forming groove 460.

The compression pin 430 may prevent the resin material from being introduced under the connection terminal part 220 when the resin material is introduced. When the injection material is covered on a part of the connection terminal part 220, the electrical connection may be unstable, which can be prevented by the compression pin 430.

Further, the lower mould 410 may include a guide groove 490 so that the radiator frame 230 includes the guide boss 240 inserted into the manufacturing mould 400 for injection-molding the case 110 of the electronic device.

The resin material is also introduced into the guide groove 490, such that the antenna pattern frame 200 may include the guide boss 240.

Figure 6A:
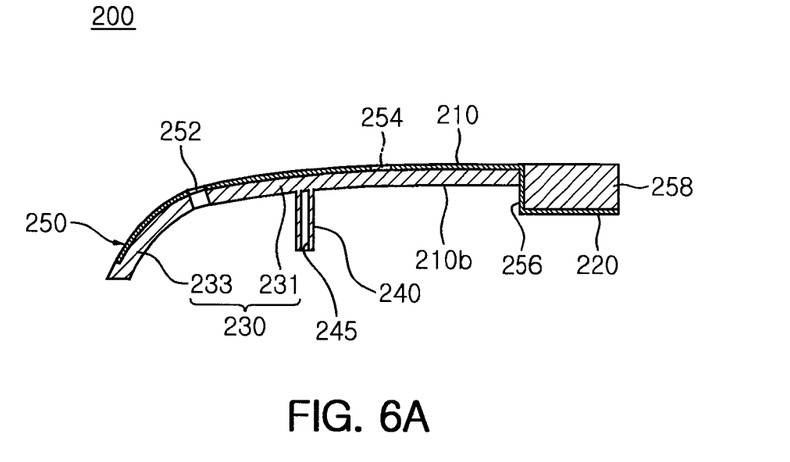
FIG. 6A is a schematic cross-sectional view showing an antenna pattern frame according to another exemplary embodiment of the present invention.
Figure 6B:
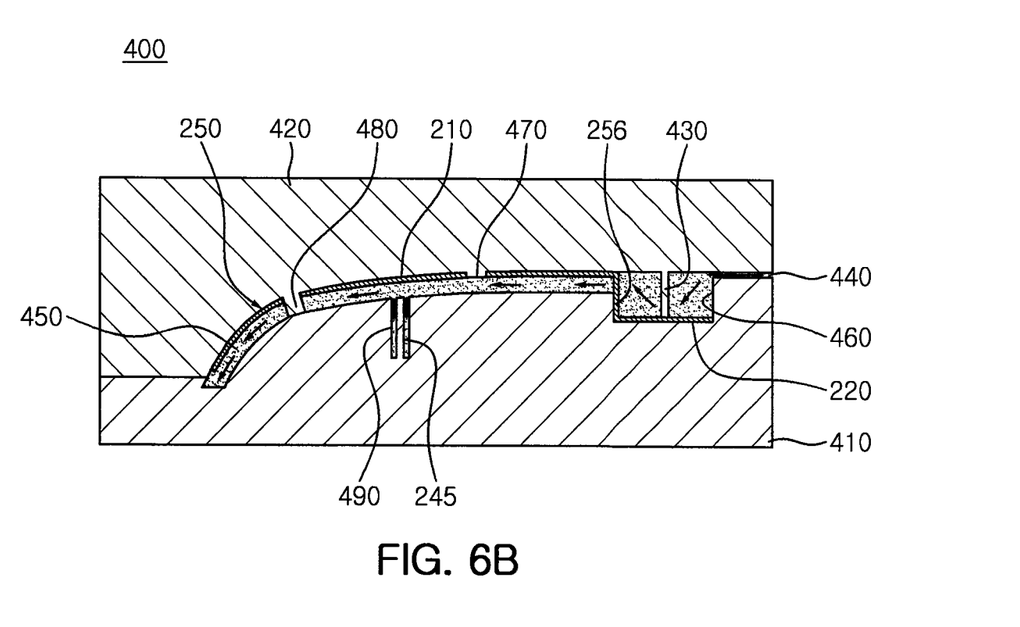
FIG. 6B is a schematic cross-sectional view showing a shape where the resin material is filled in a mould for manufacturing the antenna pattern frame in order to manufacture the antenna pattern frame of FIG. 6A.

Referring to FIGS. 6A and 6B, the antenna pattern frame 200 according to another embodiment of the present invention may include a slot part 245 in the guide boss 240.

The slot part 245 may be formed to include the protruding part corresponding to the slot part 245 in the guide groove 490 of the lower mould 410.

The resin material introduced from the resin material introducing part 440 is filled in the guide groove 490 by the slot part 245 but is filled in the region other than the protruding part due to the protruding part.

Therefore, the guide boss 240 of the antenna pattern frame 200 includes the slot part 245 and the slot part 245 serves to elastically support and fix the manufacturing mould 400 when forming the case 110 of the electronic device.

Figure 7A:
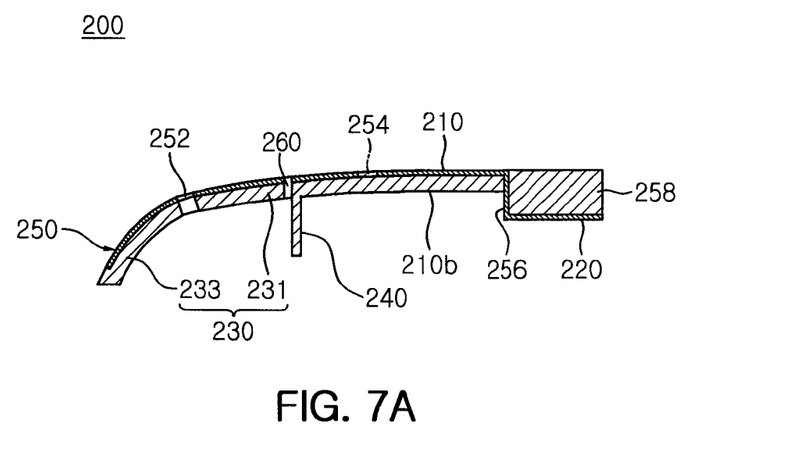
FIG. 7A is a schematic cross-sectional view showing an antenna pattern frame according to another exemplary embodiment of the present invention.
Figure 7B:
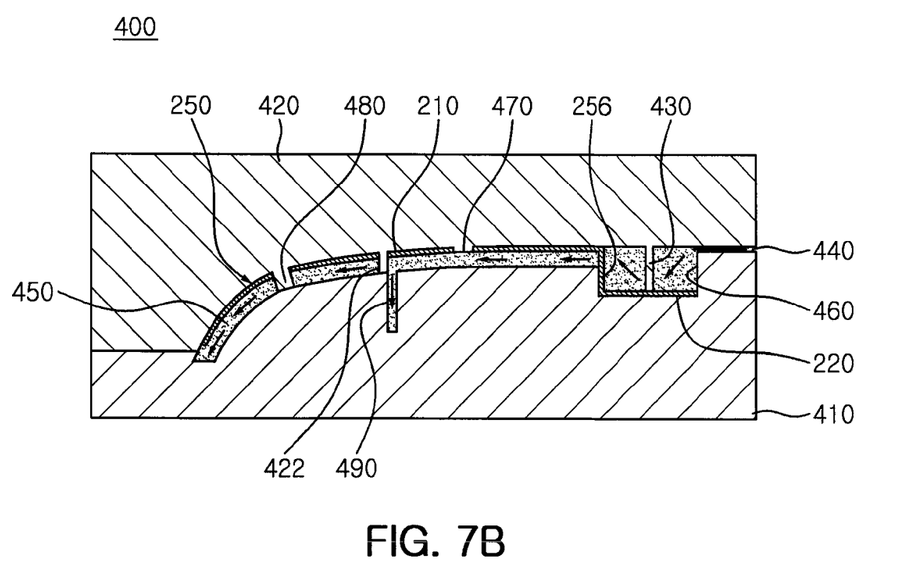
FIG. 7B is a schematic cross-sectional view showing a shape where a resin material is filled in a mould for manufacturing the antenna pattern frame in order to manufacture the antenna pattern frame of FIG. 7A.

Referring to FIGS. 7A and 7B, the antenna pattern frame 200 according to another embodiment of the present invention may include a small guide boss 240 as compared with the exemplary embodiment.

In order to form the guide boss 240, the lower mould 410 may include the small guide groove 490 and the upper mould 420 may be formed with the protruding part 422 to form the introducing hole 260 that introduces the resin material into the inner space in the mould 500 (see FIG. 12) for manufacturing the case 110 of the electronic device in which the radiator 250 is embedded.

The introduction of the resin material is prevented by the protruding part 422 and the antenna pattern frame 200 may be formed with holes.

However, it is to be noted that the protruding part 422 is to form the introducing hole 260 and is not limited to being formed in the upper mould 420. Therefore, the protruding part 422 may be formed in the lower mould 410.

Figure 8:
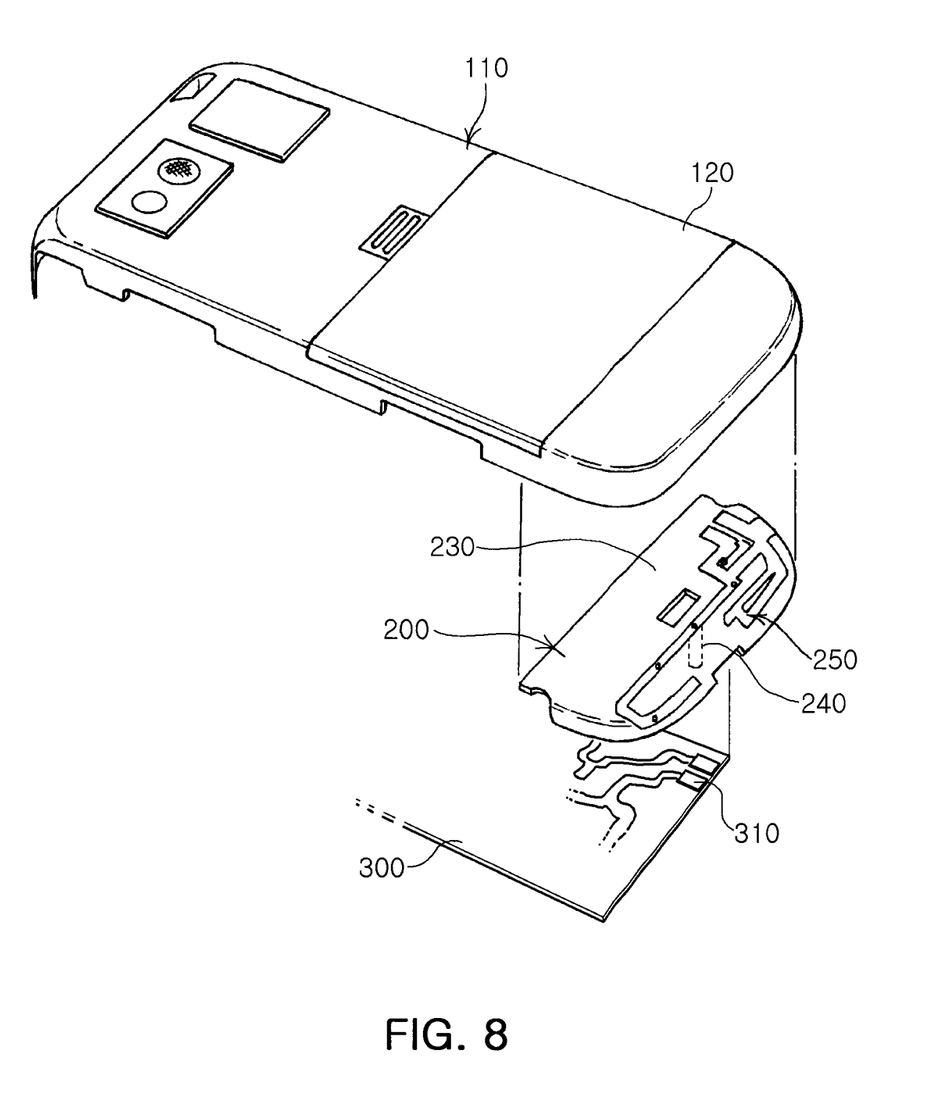
FIG. 8 is an exploded perspective view of a case of an electronic device, a mobile communication terminal according to an exemplary embodiment of the present invention in which the antenna pattern radiator is embedded.

FIG. 8 is an exploded perspective view of the case of the electronic device, the mobile communication terminal according to an exemplary embodiment of the present invention in which the antenna pattern radiator is embedded.

The case 120 of the electronic device according to the exemplary embodiment of the present invention in which the antenna pattern radiator 200 is embedded may include the radiator 250, the radiator frame 230, and the case frame 120.

The radiator 250 and the radiator frame 230 are described in the exemplary embodiment and therefore, a description thereof will be omitted.

The case frame 120 covers one surface of the radiator frame 230 in which the antenna pattern part 210 is formed to embed the antenna pattern part 210 between the radiator frames 230.

Further, the radiator frame 230 and the case frame 120 may be integrated without a clearly defined boundary therebetween. When viewing the case 110 of the electronic device from the rear, the antenna pattern part 210 may not be shown and only the connection terminal part 220 may be shown.

The radiator frame 230, the case frame 120, or the radiator frame 230 and the case frame 120 may be formed by the injection molding. In particular, when the radiator frame 230 and the case frame 120 are formed of a separate injection fixture, the case 120 of the electronic device is manufactured by bonding the radiator frame 230 in which the radiator 250 is formed to the case frame 120.

Meanwhile, the case frame 120 is injection-molded in the radiator frame 230, such that it may be subjected to a double injection molding. In other words, the radiator frame 230 is disposed in the mould and is then subjected to insert injection, thereby making it possible to integrate the radiator frame 230 and the case frame 120.

When the guide pin hole 252 or the contact pin hole 254 formed in the radiator frame 230 is disposed in the mould 500 (see FIG. 10) for manufacturing the case of the electronic device, they are combined with the guide pin or the contact pin (not shown) formed in the manufacturing mould 500, thereby making it possible to prevent the antenna pattern frame 200 from moving in the manufacturing mould 500.

Figure 9:
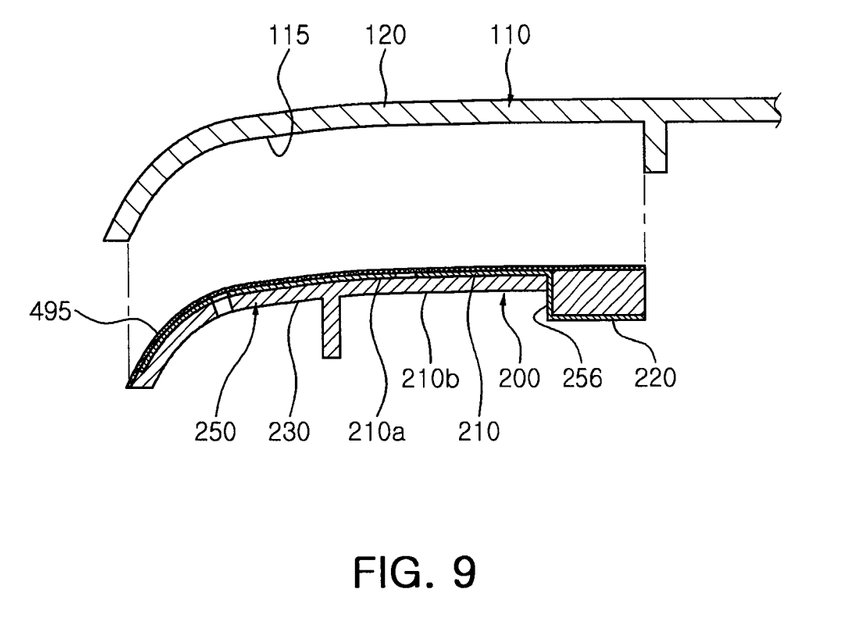
FIG. 9 is a schematic diagram showing a method for manufacturing the case of the electronic device according to an exemplary embodiment of the present invention in which the antenna pattern radiator is embedded.

FIG. 9 is a schematic diagram showing a method for manufacturing the case of the electronic device according to an exemplary embodiment of the present invention in which the antenna pattern radiator is embedded.

Referring to FIG. 9, the case frame 120 is a separate injection product having a radiator receiving groove 115 in a shape corresponding to the radiator frame 230 and the case 110 of the electronic device in which the antenna pattern radiator is embedded by bonding the radiator frame 230 to the radiator receiving groove 115 may be manufactured.

An adhesive layer 495 is formed on the surface of the radiator 250 of the antenna pattern frame 200.

FIGS. 10 through 13 are schematic cross-sectional views showing a process of inserting the antenna pattern radiator into the mould for manufacturing the electronic device and a shape where the resin material is filled in order to manufacture the case of the electronic device according to the first through fourth embodiments of the present invention.

Figure 10A:
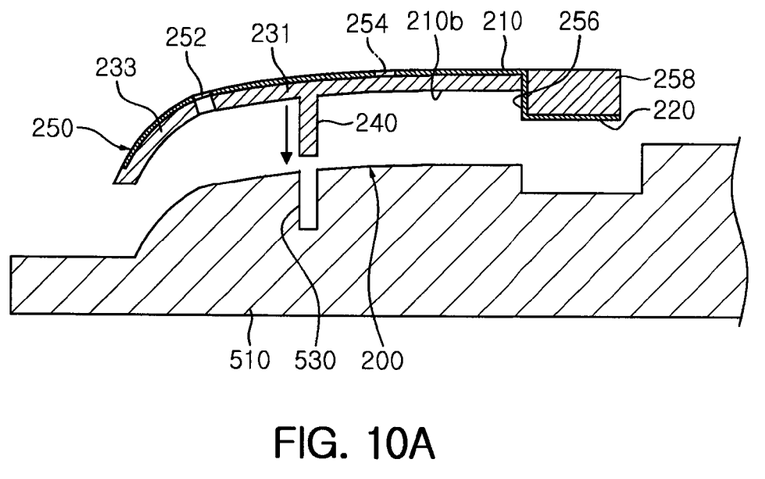
FIGS. 10 to 13 are schematic cross-sectional views showing a process of inserting the antenna pattern radiator into the mould for manufacturing the electronic device and a shape where the resin material is filled in order to manufacture the case of the electronic device according to the first through fourth embodiments of the present invention.
Figure 10B:
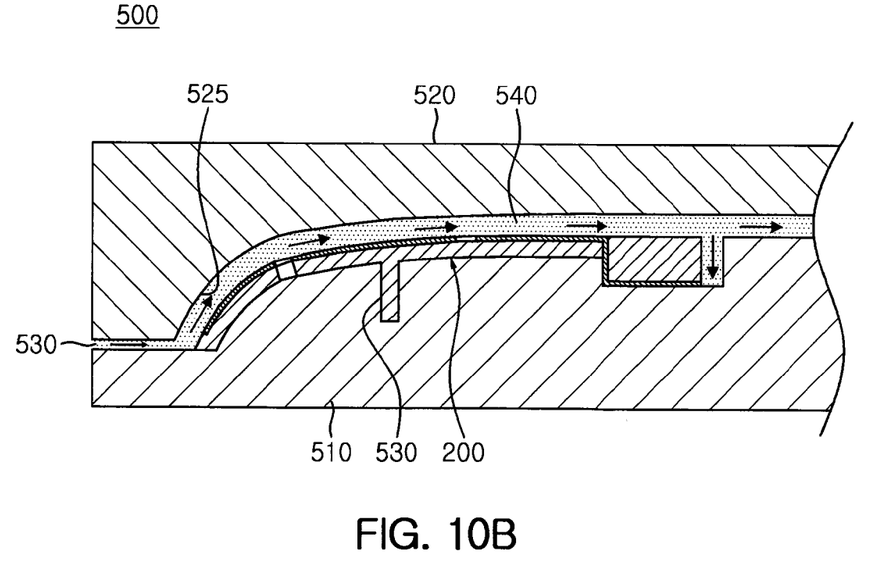

Referring to FIG. 10, the guide boss 240 of the antenna pattern frame 200 is fixed and supported by being inserted into the guide groove 530 of the lower mould 510.

The radiator frame 230 is disposed in the mould 500 for manufacturing the case of the electronic device having an inner space 540 accommodating the radiator frame 230 and the resin material is introduced into the mould, such that the radiator frame 230 is integrated with the case 110 of the electronic device.

Meanwhile, the radiator frame 230 and the case frame 120 may be formed without a clearly defined boundary therebetween.

When the injection of the antenna pattern frame 200 is called the primary injection and the injection of the case 110 of the electronic device is called the secondary injection, the antenna pattern frame 200 may be fixed and supported not to move by the guide boss 240 and the guide groove 530 in the secondary injection manufacturing mould 500, even in the secondary injection as in the primary injection.

In other words, the guide boss 240 is inserted into the secondary injection mould 500 to serve to fix and support the injection product, that is, the radiator frame 230 so that the injection product can withstand the high temperature and the high injection pressure.

Further, the inner space 540 of the manufacturing mould 500 may include the curve forming part 525 so that the case 110 of the electronic device has the curve part.

Meanwhile, the mould 500 for manufacturing the case of the electronic device that manufactures the case 120 of the electronic device in which the antenna pattern is embedded by the secondary injection may form the antenna pattern part 210 receiving the external signals and the connection terminal part 220 contacting the circuit substrate of the electronic device on a different plane.

The radiator frame 230 having the radiator 250 is formed in the upper or lower moulds 510 and 520 and the upper and lower moulds 510 and 520 of the mould for manufacturing the case of the electronic device and when the upper or lower moulds 510 and 520 are combined with each other, the case of the electronic device may include the resin material introducing part 530 introducing the resin material into the inner space so that the inner space 540 formed in the mould becomes the case 120 of the electronic device.

Similar to the radiator 250, the radiator frame 230 is provided with the guide pin hole or the contact pin hole, wherein the guide pin hole or the contacting hole may be fixed to the guide pin or the contact pin formed in the manufacturing mould 500. This is to prevent the radiator frame 230 from moving in the manufacturing mould.

Figure 11A:
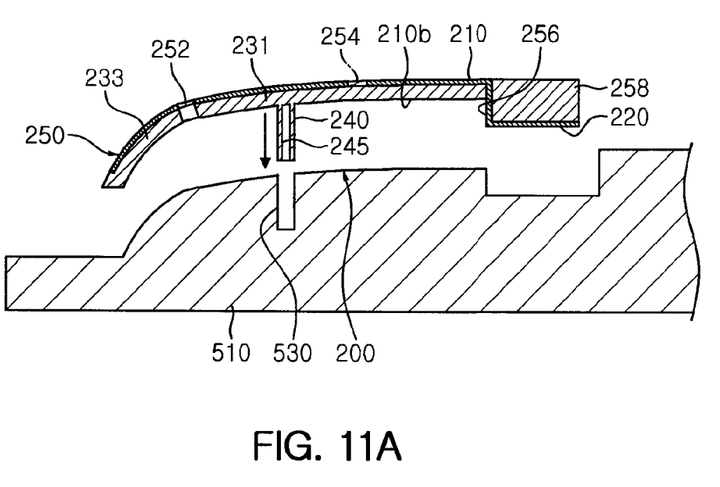
Figure 11B:
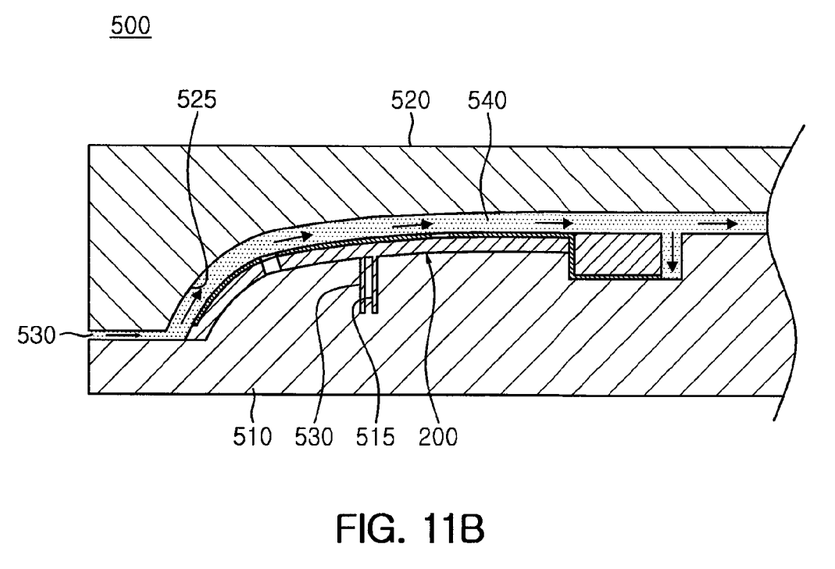

Referring to FIG. 11, the guide boss 240 can be easily inserted into the guide groove 530 of the lower mould 510 by the slot part 245 in the guide boss 240 of the antenna pattern frame 200 and then, be fixed and supported to the outside of the slot part 245 by its elasticity. As a result, the guide boss 240 has a structure capable of withstanding high injection pressure.

Figure 12A:
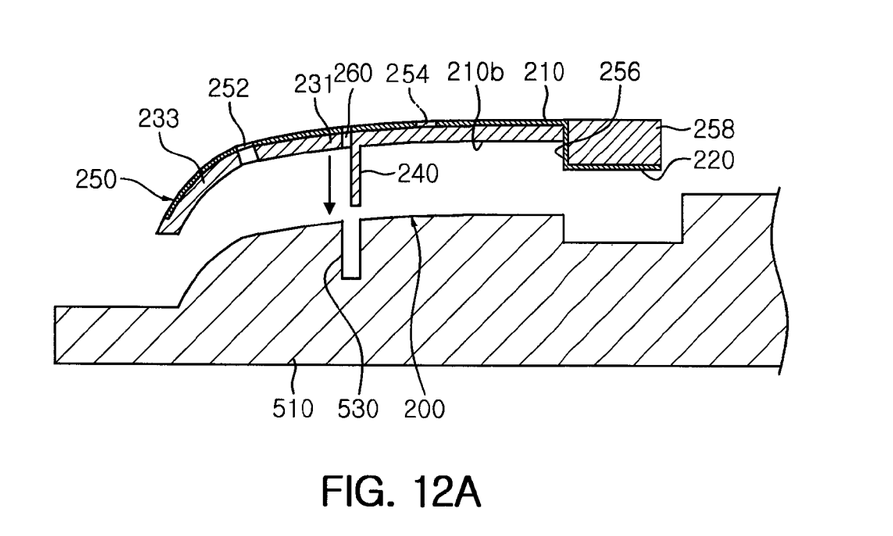
Figure 12B:
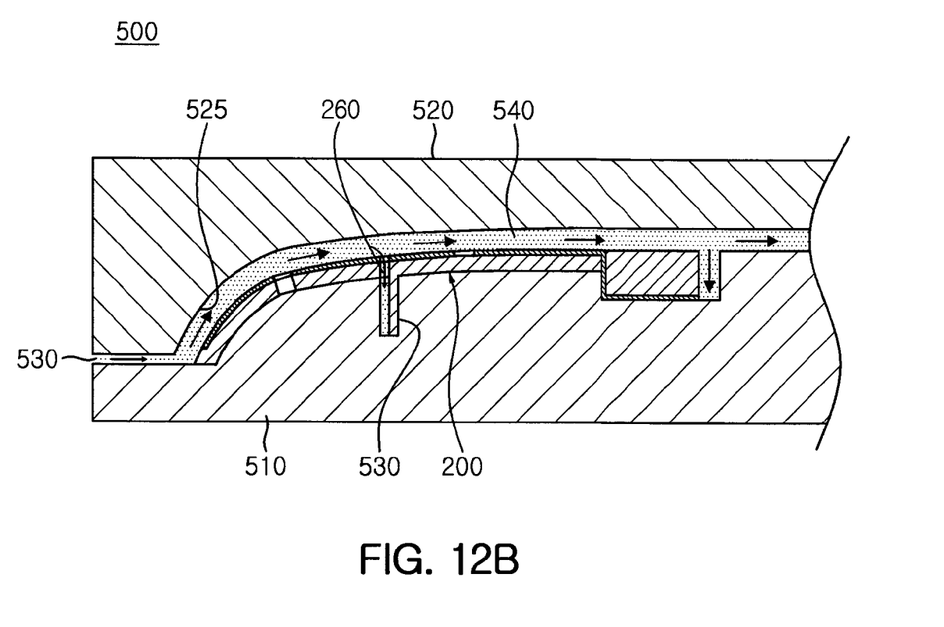

Referring to FIG. 12, the guide boss 240 of the antenna pattern frame 200 is inserted into the guide groove 530 of the lower mould 510 and then, a space may be formed in a predetermined area of the guide groove 530.

The resin material is introduced into the resin inlet 530, such that it is introduced into the introducing hole 260 of the antenna pattern frame 200. Thereafter, the resin material may also be filled in the space of the guide groove 530.

In this case, since the antenna pattern frame 200 is fixed and supported by the flowing of the resin material, the guide boss has a structure capable of withstanding the injection pressure.

Figure 13A:
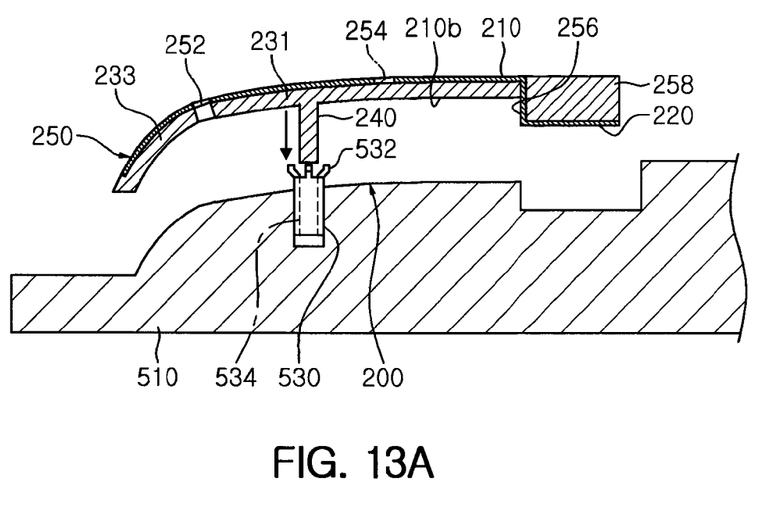
Figure 13B:
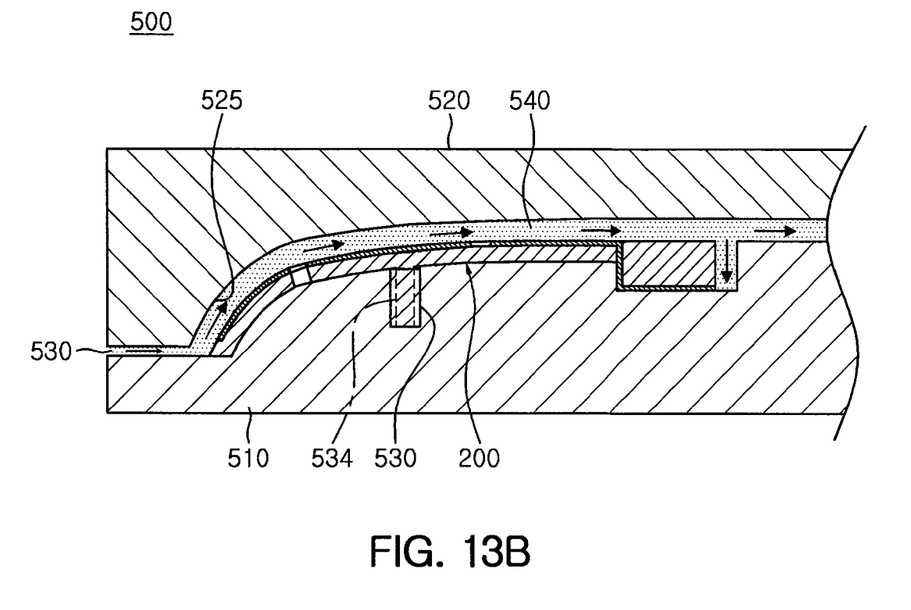

Referring to FIG. 13, the guide groove 530 includes a guide boss receiving part to fix and support the guide boss 240 and the guide boss receiving part may include a variable part 532 having a diameter larger than that of the guide boss 240 and a fixing part 534 having a diameter smaller than that of the variable part 532.

The variable part 532 receives the guide boss 240 by being protruded to the upper portion of the lower mould before the guide boss 240 is inserted and then, is inserted into the guide groove 530 of the lower mould, such that the antenna pattern frame 200 is fixed and supported to the lower mould 510.

Therefore, the antenna pattern frame 200 may be easily fixed to the lower mould 510 by the guide boss receiving part 530 configured of the variable part 532 and the fixing part 534 and can withstand high-temperature and high-pressure injection liquid.

As set forth above, the antenna pattern frame, the case of the electronic device, and the mould for manufacturing the same according to the present invention stably fixes the antenna pattern frame to the inner space of the mould for manufacturing the case of the electronic device when molding the case of the electronic device in which the antenna radiator is embedded, thereby making it possible to reduce the appearance defect and to provide a structure withstanding the high-temperature and high-pressure injection liquid when performing the injection molding.

While the present invention has been shown and described in connection with the exemplary embodiments, it will be apparent to those skilled in the art that modifications and variations can be made without departing from the spirit and scope of the invention as defined by the appended claims.

What is claimed is:

1. An antenna pattern frame, comprising:
   a radiator that includes an antenna pattern part transmitting and receiving signals and a connection terminal part transmitting and receiving the signals to and from a circuit substrate of an electronic device; and
   a radiator frame that embeds the antenna pattern part in a ease of the electronic device and supports the radiator, the radiator being manufactured by injection molding, molding, the antenna pattern part being located on one surface of the radiator frame and the connection terminal part being located on an opposing surface of the one surface of the radiator frame,
   wherein the antenna pattern frame further comprises a guide boss protruding from the opposing surface of the radiator frame and being insertable into a manufacturing mould for injection-molding the case of the electronic device in which the radiator is embedded.

2. The antenna pattern frame of claim 1, wherein the guide boss includes a slot part therein so that it is elastically supported and fixed to the manufacturing mould.

3. The antenna pattern frame of claim 1, wherein the radiator frame includes an introducing hole formed to introduce a resin material when injection-molding the case of the electronic device.

4. The antenna pattern frame of claim 1, wherein the radiator includes a connection part that is a part of the radiator and connects the antenna pattern part to the connection terminal part, and
   the connection part is formed so that the antenna pattern part is located on one surface of the radiator frame and the connection terminal part is located on an opposite surface to the one surface.

5. The antenna pattern frame of claim 1, wherein the connection terminal part contacts and supports the radiator supporting part that is protruded from the opposite surface of the one surface on which the antenna pattern part of the radiator frame is formed.

6. A case of an electronic device, comprising:
a radiator that includes an antenna pattern part transmitting and receiving signals and a connection terminal part transmitting and receiving the signals to and from a circuit substrate of an electronic device;
a radiator frame including a guide boss that supports and fixes the radiator, the antenna pattern part being located on one surface of the radiator frame and the connection terminal part being located on an opposing surface of the one surface of the radiator frame, and
a case frame that covers one surface of the radiator frame to embed the antenna pattern part between the radiator frames, wherein the antenna pattern frame further comprises a guide boss protruding from the opposing surface of the radiator frame and insertable into a manufacturing mould for injection-molding the case of the electronic device in which the radiator is embedded.

7. The case of the electronic device of claim 6, wherein the guide boss includes a slot part so that it is elastically supported and fixed to the manufacturing mould.

8. The case of the electronic device of claim 6, wherein the radiator frame includes an introducing hole formed to introduce a resin material when injection-molding the case of the electronic device.

9. The case of the electronic device of claim 8, wherein the introducing hole is formed to integrate a resin material introduced through the introducing hole with the guide boss.

10. The case of the electronic device of claim 6, wherein the connection part is formed so that the antenna pattern part is located on one surface of the radiator frame and the connection terminal part is located on an opposite surface to the one surface.

11. The case of the electronic device of claim 6, wherein the connection terminal part contacts and supports the radiator supporting part that is protruded from the opposite surface of the one surface on which the antenna pattern part of the radiator frame is formed.

* * * * *